Sept. 17, 1963 W. C. MOOG 3,103,739
METHOD OF MAKING BUSHING FOR A PRECISION
HYDRAULIC SERVO MECHANISM
Filed Nov. 18, 1959 3 Sheets-Sheet 1

INVENTOR
William C. Moog, Jr.
BY Popp and Sommer
ATTORNEYS

Sept. 17, 1963 W. C. MOOG 3,103,739
METHOD OF MAKING BUSHING FOR A PRECISION
HYDRAULIC SERVO MECHANISM
Filed Nov. 18, 1959 3 Sheets-Sheet 2
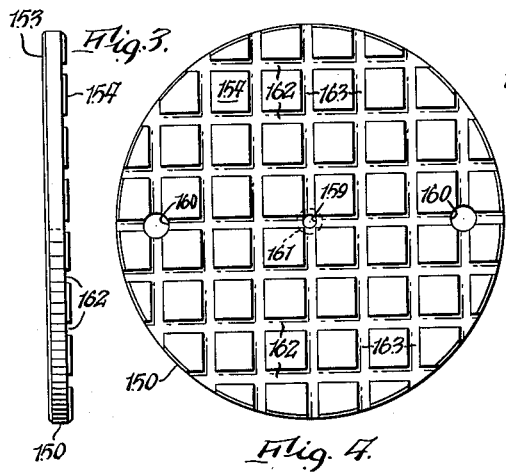
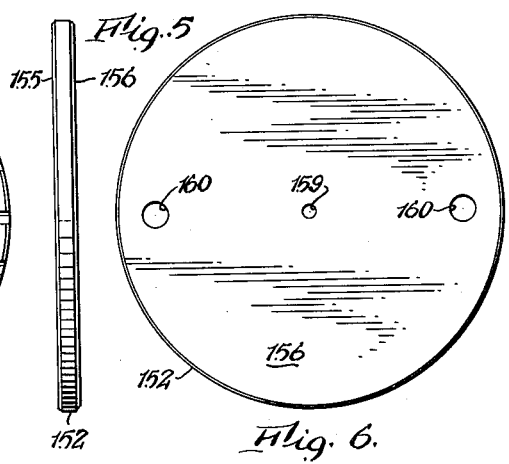
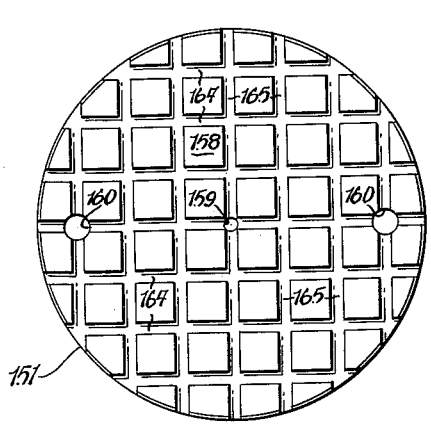
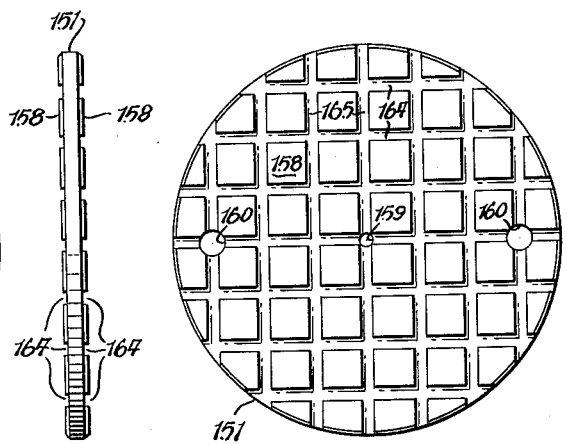
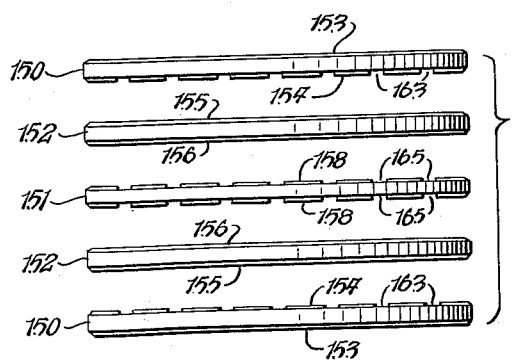
INVENTOR
William C. Moog, Jr
BY Popp and Sommer
ATTORNEYS

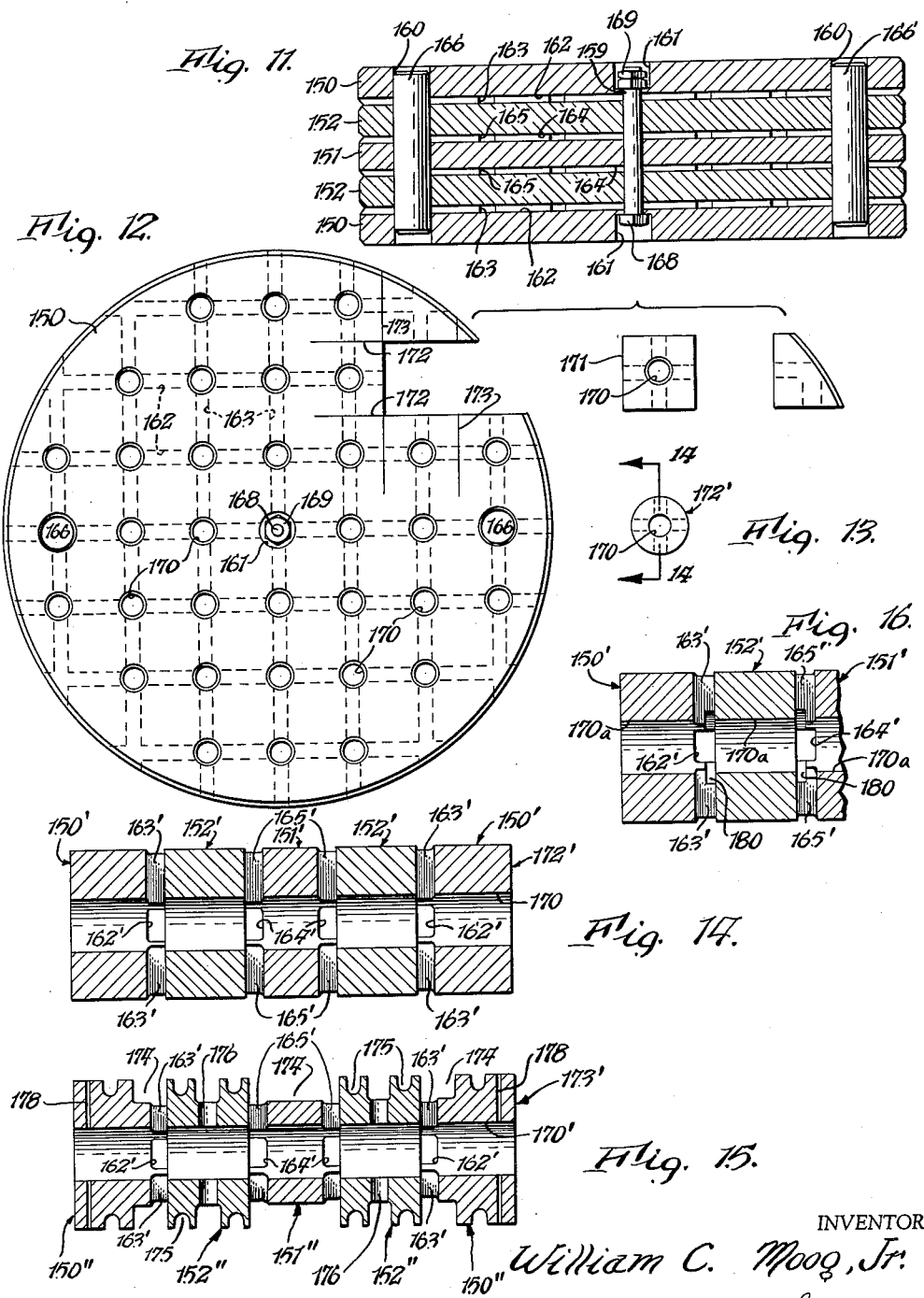

United States Patent Office 3,103,739
Patented Sept. 17, 1963

3,103,739
METHOD OF MAKING BUSHING FOR A PRE-
CISION HYDRAULIC SERVO MECHANISM
William C. Moog, East Aurora, N.Y., assignor to Moog
Servocontrols, Inc., East Aurora, N.Y., a corporation
of New York
Filed Nov. 18, 1959, Ser. No. 853,800
7 Claims. (Cl. 29—157.1)

This invention relates generally to valve spool bushings and more particularly to a method of making a bushing for a precision hydraulic servo mechanism or valve of the type shown in my Patent No. 2,767,689.

This application comprises a continuation in part of my pending application Serial No. 371,933, now Patent No. 2,920,650.

Valve spool bushings such as that disclosed in my aforesaid patent and copending application must meet certain critical requirements. For example, the valve spool controlled openings through the bushing must be accurately positioned axially of the bushing with relation to each other and with relation to the valve spool. This is necessary in order that when the valve spool is actuated in response to a signal it will immediately open the desired port to the required degree in order to secure the proper response. Thus, if the spool controlled openings are not accurately positioned relative to each other and to the valve spool, the desired accuracy of control cannot be achieved.

Also, it is highly desirable that the spool controlled openings be of flat-sided form, as distinguished from round openings, whereby the response in terms of fluid flow through said openings will be linear as the valve spool moves to open said openings. In addition, it is desired to enable relatively large fluid flow without unduly increasing the axial stroke of the valve spool such as might adversely affect the accuracy of the mechanism.

Normally, bushings are formed from an integral member, but it is seriously questioned whether a bushing meeting the foregoing requirements can be so formed using conventional techniques, and in any event to so form such a bushing would be impractical.

Furthermore, it will be observed from my aforesaid patent and copending application that the valve body is preferably made of aluminum, whereas the bushing is made of steel, the bushing being retained in place by end caps which bear thereagainst and are fastened to the valve body. Normally, the end caps would be formed to bear simultaneously against the bushing and the valve body, but it has been found that upon unequal expansion of the valve body and the bushing under abnormal temperature conditions there is a tendency for the end caps to separate completely from the bushing, permitting the bushing a limited floating movement which, no matter how limited in degree, adversely affects the accuracy of the mechanism.

Accordingly, it is an object of this invention to provide a novel method of making a valve spool bushing of this general type having accurately positioned spool controlled openings of the desired shape, and which method is relatively inexpensive, highly practical, and which utilizes conventional tools and techniques.

The method of making a valve spool bushing according to my invention is characterized in that the bushing is formed in a number of component parts for assembly in end-to-end relation, forming certain component part ends to a substantially smooth and flat surface radial to the bore, forming radial recesses of the desired form in certain component part ends, assembling said component parts in end-to-end relation, whereby said formed ends abut to define the desired openings, and joining said component parts in assembled relation.

A bushing according to my invention is characterized in having a number of abutting components, certain components having substantially smooth radial ends defining one wall part of radial openings in said bushing, the component ends abutting said radial ends having radial recesses therein to define the other side wall parts of said openings, said components being joined together.

Another object of the invention is to provide an improved method which permits the opposing faces of a number of plates to be machined separately prior to being joined together into a unitary structure which can thereafter be divided up into a plurality of sections serving as bushing blanks adapted severally for internal and external finish machining, thereby improving metering edge alignment, providing better manufacturing control, reducing the handling of many pieces for some operations, and substantially reducing the costs of manufacture.

The foregoing and other objects will become clearly apparent from the ensuing detailed description, taken together with the accompanying drawing forming a part thereof wherein:

FIGS. 3–15 are views of various parts of a valve spool bushing constructed according to another practice of the method of the present invention, these figures now to be individually described.

FIG. 3 is an edge view of one of the end plates forming a component part of the bushing.

FIG. 4 is an elevational view of the inner end face thereof, as viewed from the right of FIG. 3.

FIG. 5 is an edge view of one of the intermediate or spacer plates forming another component part of the bushing.

FIG. 6 is an elevational view of one end face thereof, as viewed from either side of FIG. 5.

FIG. 7 is an edge view of the center plate forming still another component part of the bushing.

FIG. 8 is an elevational view of one end face thereof, as viewed from the left of FIG. 7.

FIG. 9 is an elevational view of the other end face thereof, as viewed from the right of FIG. 7.

FIG. 10 is an edge view of five plates of the type shown in FIGS. 3–9 and illustrated in parallel, spaced and superposed position.

FIG. 11 is a vertical central sectional view through an assembly of the five plates shown in FIG. 10 on a slightly enlarged scale.

FIG. 12 is a top plan view of the assembly of plates shown in FIG. 11 and representing the same after being brazed together and after having a pattern of spaced through-holes provided therein, and further illustrating typical sections cut therefrom including one which represents a bushing blank after brazing and cut so that one of the aforementioned holes extends centrally and longitudinally therethrough.

FIG. 13 is an end view of the bushing blank shown in FIG. 12 after being externally machined into cylindrical form.

FIG. 14 is a vertical central longitudinal sectional view thereof, on an enlarged scale, and taken on line 14—14 of FIG. 13.

FIG. 15 is a view similar to FIG. 14 but showing the bushing after being internally and externally machined into finished form.

FIG. 16 is a fragmentary longitudinal central sectional view through a modified bushing blank.

Figure 1:
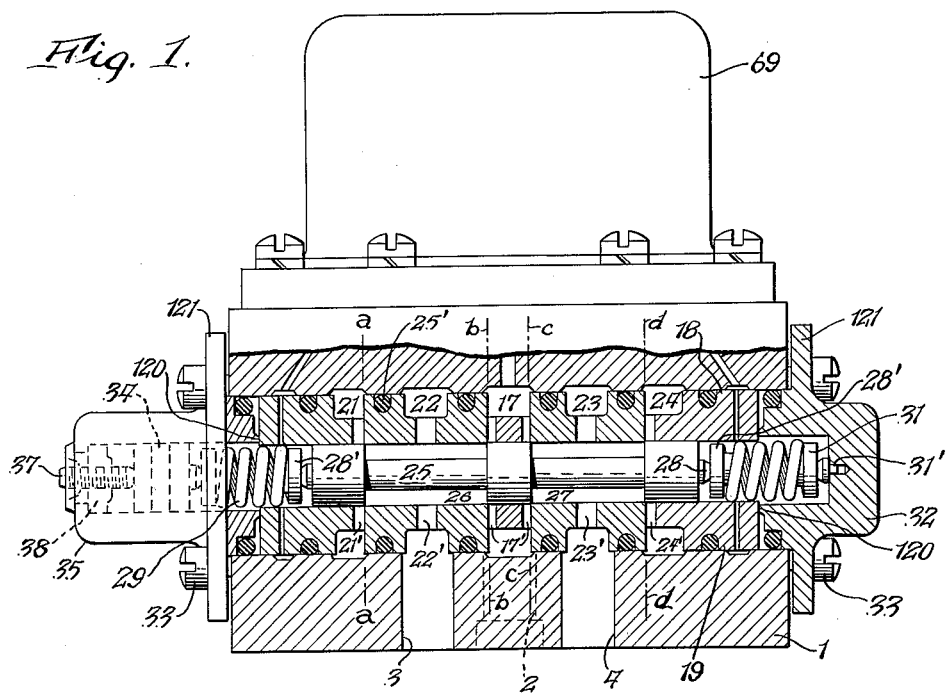
FIG. 1 is a somewhat schematic view in side elevation of an electro-hydraulic servo mechanism of the type disclosed in my aforesaid patent and copending application, with the bushing and related parts being shown in section for purposes of this invention.

While not necessarily limited thereto, or even to valve spool bushings generally, my invention is disclosed herein with respect to the valve spool bushing assembly disclosed in my aforesaid patent and copending application. Thus, these is illustrated in FIG. 1 a valve body 1 formed preferably of aluminum and having therein a pressure fluid supply port 2 and pressure fluid control ports 3 and 4. Bushing 18 is mounted within the valve body bore 19, and said bushing has a series of annular grooves therearound which cooperate with annular recesses in the wall of bore 19 to define therebetween a series of annular passages 17, 21, 22, 23 and 24, passages 22 and 23 communicating with ports 3 and 4, respectively, and passage 17 communicating with port 2.

Bushing 18 has a series of radial passages 17', 21', 22', 23' and 24' for placing the corresponding annular passages in communication with the bore of said bushing. In addition, bushing 18 is provided intermediate each of the aforesaid annular passages and adjacent the opposite ends thereof with annular grooves adapted to receive therein O ring seals 25' adapted to bear against the wall of bore 19 for fluid sealing purposes.

A valve spool 25 is slidably mounted within bushing 18 for axial movement therein, said spool being provided with spaced annular grooves 26 and 27 on opposite sides of the midpoint thereof for selectively placing passages 17 in communication with passages 22 and 23 to control fluid flow through control ports 3 and 4 as fully described in my said patent.

FIG. 1 also shows the pivot pins 28, members 28', springs 29, members 31, pivot pins 31', member 34, end block 38, and adjustment screw 37, all as and for the purpose disclosed in my said patent, together with end caps 32 and 35 secured to valve body 1 as by means of screws 33. Cap 69 contains an electromagnetic motor and various nozzles all as disclosed in my said patent, whereby valve spol 25 is driven by changes in the pressure differential between separate hydraulic amplifiers acting on opposite ends thereof induced by a signal responsive electric motor, the valve spool being proportionately controlled in response to the magnitude of the control signal, all as fully set forth in my said patent. Thus, the arrangement of FIG. 1, except as to certain details of end cap construction as will appear more fully hereinafter, and the operation thereof correspond to the disclosure of my said patent, and reference is accordingly made thereto for such further description as may be necessary.

As previously set forth, this application is concerned with the bushing construction and with a method of making the bushing, and this will now be described. In order to achieve a high degree of accuracy in the valve mechanism, control movements of valve spool 25 should be relatively slight, and accordingly openings 21', 17' and 24' must be accurately positioned with respect to each other and to valve spool 25. It will be observed from the illustrated embodiment that there are four critical planes $a$, $b$, $c$ and $d$, which planes define the side of passages 21', 17', 17' and 24', respectively, which open first upon opening movements of valve spool 25. These side wall parts must be accurately positioned so that the passages will be opened to the desired degree upon control movements of valve spool 25.

In addition, it is considered essential that passages 21', 17', 17' and 24' be of flat-sided form, whereby the response of the valve as determined by the flow of pressure fluid through the appropriate passages as the valve spool is moved remains essentially linear.

It will be appreciated that to make such a bushing from a single piece of metal using conventional techniques is impractical if not impossible.

Figure 2:
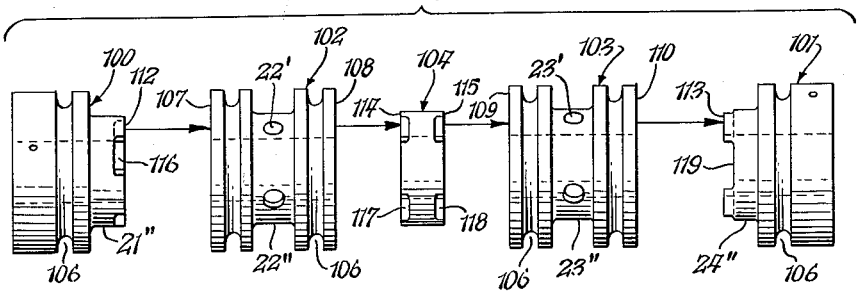
FIG. 2 is an exploded view of the separate component parts of the valve spool bushing constructed according to one practice of the method of the present invention.

According to one practice of my inventive method, bushing 18 is formed of a number of separate component parts identified in FIG. 2 as comprising opposed end parts 100 and 101, intermediate parts 102 and 103, and a center part 104. These parts are initially formed to the approximate size desired, and are adapted for assembly in end-to-end relation as indicated in FIG. 2 to comprise the bushing.

Annular grooves 106 are roughly formed in the end and intermediate parts 100, 101, 102 and 103, such grooves being adapted when finished to receive the O ring seals 25', and larger annular grooves 21'', 22'', 23'' and 24'' are formed therein for defining with the wall of bore 19 the corresponding annular passages therearound. These grooves are formed in a conventional manner as on a lathe, using appropriate forming tools. Also, center part 104 is formed to the proper diameter whereby to define with the wall of bore 19 the annular passage 17. The passages 22' and 23' are formed in parts 102 and 103 as by conventional drilling techniques, the passages so formed being perfectly acceptable for the intended purpose.

Most important, the critical openings 21', 17', 17' and 24' are formed at this stage, and this is accomplished in the following manner. It will be observed that end faces 107 and 108 of part 102 are adapted to lie in planes $a$ and $b$, respectively, and that end faces 109 and 110 of part 103 are adapted to lie in planes $c$ and $d$, respectively. These end faces are ground down until the parts 102 and 103 provide the desired distance between their end faces and until said end faces are substantially smooth and normal to the bore. It will be appreciated that this requires only conventional grinding techniques, and is readily accomplished by virtue of the component parts being separate. Thus, the critical wall surfaces of the spool controlled passages are thus accurately formed and positioned.

The end faces 112 and 113 of parts 100 and 101 are similarly ground to substantial smoothness to properly abut the end faces 107 and 110, and the center part 104 has its opposite end faces 114 and 115 similarly ground to substantial smoothness and to provide the necessary spacing between end faces 108 and 109.

In this way, the critical passage surfaces defined by the planes $a$, $b$, $c$ and $d$ are readily and accurately formed by conventional grinding techniques.

While the component parts remain separate, flat-walled recesses 116, 117, 118, and 119 are formed in end faces 112, 114, 115 and 113, respectively, as by conventional milling techniques whereby to define the other wall parts of the critical passages and whereby the desired flat-sided passage is readily achieved. It will be noted that recesses of any desired size and number can be readily formed in this manner.

The abutting surfaces 107 and 112, 108 and 114, 109 and 115, and 110 and 113 are then copper plated, and the parts are assembled in end-to-end relation in the order illustrated in FIG. 2, as on a ceramic rod whereby they are substantially centered. When thus assembled, the parts are then brazed together, as by conventional copper brazing techniques in a temperature of, for example, approximately 2050° F., following which said parts are securely joined in the desired assembled relation. It will be appreciated that suitable alloys can be used in place of copper, and other materials such as copper shim stock can be used instead of plating.

The assembled bushing parts are then hardened as by heat treating with a temperature of from 1400° F. to 1700° F., following which the grooves 106 are finished and the assembled bushing is finished to the desired form, utilizing conventional techniques.

Thus, by means of my invention, a bushing is provided wherein the spool controlled passages are extremely accurately positioned and are of the desired flat-sided form to provide an accurate linear response, the bushing being made by conventional and inexpensive techniques in a highly practical manner.

In addition, it will be appreciated that any number of recesses, and recesses of any desired size, can readily be formed in the appropriate end faces to provide the desired flow of control fluid through the passages defined thereby, all without requiring an excessive stroke of the valve spool such as might adversely affect the valve performance.

Also, the copper brazing joining of the parts enables subsequent heat treating thereof.

End caps 32 and 35 are each formed at their inner ends with a circular raised boss portion 120 adapted to bear against the opposite ends of bushing 18 to retain the same in centered relation. Said boss portions 120 are relatively thin, having for example a thickness on the order of 0.01," and are designed to bear against bushing 18 adjacent the bore therethrough, whereby to minimize and essentially eliminate any undesired twisting action between the bushing and the end caps upon fastening the end caps on the valve body. Also, since the end caps are formed of aluminum, stresses between the bushing and the end caps such as might adversely affect the positioning of the bushing would be relatively high by reason of the thin boss portions and would thereby deform the aluminum end cap boss portion 120 instead of causing an undesired twisting action on the bushing.

Normally, end caps 32 and 35 would be formed with the lateral fastening flange portions 121 thereof adapted to abut the ends of valve body 1 upon boss portions 120 contacting bushing 18. However, when so formed, it has been found that under relatively extreme temperature conditions to which these valves might be subject, the expansion of the steel bushing and of the aluminum valve body is likely to be so unequal as to cause the body to expand and lift said end caps completely away from the opposite ends of bushing 18, whereby said bushing is left free to float within bore 19. It will be appreciated that even a slight free floating action would seriously affect the accuracy of the valve.

This undesirable result is precluded according to my invention by forming end caps 32 and 35 to provide a slight clearance on the order of .003 inch between fastening flange portions 121 and body 1. Thus, as illustrated in FIG. 1, with the boss portions 120 bearing against the opposite ends of bushing 18, there will be the aforesaid clearance between the body and the flange portions 121. Screws 33 are then tightened whereby flange portions 121 are sprung in through said clearance to abut the valve body. With this arrangement, the end cap fastening flange portions are sprung in for fastening purposes, and the springing action of said flange portions 121 will absorb and compensate for unequal expansion between body 1 and bushing 18 such as to substantially avoid freeing bushing 18 under expected conditions of use. Also, this arrangement precludes undesired variation in the pressure loading of springs 29 on valve spool 25 by reason of such unequal expansion.

In the foregoing practice of the method of making a valve spool bushing described in connection with FIGS. 1 and 2, the component bushing parts 100 to 104 are tubular in form prior to being assembled and brazed together.

With another practice of the inventive method now to be described in connection with FIGS. 3 to 15, the component bushing parts are initially in the form of plates. Five plates are shown including two end plates 150, 150, a center plate 151 and two spacer plates 152, 152 arranged severally intermediate the end plates and center plate.

Each plate is shown as being circular in form with flat and parallel opposite end surfaces. Thus each of the end plates 150 has an outer end surface 153 and an inner end surface 154; each of the spacer plates has an outer end face 155 and an inner end face 156; and the center plate has opposite end faces 158, 158. The various plates 150 to 152 are ground or otherwise provided with the flat and parallel end faces so as to provide the desired perpendicular spacing between the respective faces.

Each of the various plates 150 to 152 is provided with a central through hole 159 and a pair of outer holes 160, 160 arranged adjacent the peripheral margin of the plate and diametrically on opposite sides of the center hole 159. The outer holes 160 are shown as being larger in diameter than the center hole 159. This center hole 159 as provided in each of the end plates 150 is shown as being enlarged in recess from the outer end face 153 or counterbored as indicated at 161.

The various holes 159 and 160 of the various plates 150 to 152 are so disposed that they can be alined respectively for a purpose to be explained hereinafter.

Referring to FIGS. 3 and 4, the end face 154 of each of the end plates 150 is shown as provided with a first series of flat-sided, spaced, uniform and rectilinear grooves 162. The grooves 162 are parallel to the diametral line connecting the centers of the holes 159 and 160 in the plate 150. The end face 154 is also provided with a second series of flat-sided, spaced, uniform and rectilinear grooves 163, which extend perpendicularly to the first series of grooves 162 and intersect therewith. The grooves 162 and 163 are shown as being of the same width and depth and their opposing flat sides extend perpendicularly to the end face 154 of the end plate. As shown several grooves are provided in each series.

Referring to FIGS. 7 to 9, each end face 158 of the center plate 151 is shown as provided with a first series of flat-sided, spaced, uniform and rectilinear grooves 164 which extend parallel to the diametral line connecting the centers of the holes 159, 160 in this plate 151. Each such end face 158 is also provided with a second series of flat-sided, spaced, uniform and rectilinear grooves 165 which extend perpendicularly to the grooves 164 and intersect the same. The grooves 164 and 165 in the center plate 151 have the same width and depth and are of the same number as the grooves 162 and 163, respectively, in each of the end plates 150. The opposing flat sides of the grooves 164 and 165 extend perpendicularly to the corresponding end face 158 of the center plate.

It will be seen that if a stack of the various plates 150 to 152 is made so that the various holes 159 and 160 in each of these plates are in corresponding registry, the corresponding series of grooves 162 and 164 will be in mutually superposed parallelism. Likewise, the corresponding series of grooves 163 and 165 will be in mutually superposed parallelism.

However, before joining or physically bonding the plates together as by brazing, each of the plates is provided with a suitable coating of copper. Such coating of copper is preferably applied by electroplating.

Referring to FIG. 10, two copper plated end plates 150, two copper plated spacer plates 152 and one copper plated center plate 151 can be arranged in the order illustrated. Thus, the grooved end face 154 of the upper end plate 150 faces the outer and ungrooved end face 155 of the upper intermediate or spacer plate 152; the grooved end face 154 of the lower end plate 150 faces the outer and ungrooved end face 155 of the lower intermediate or spacer plate 152; and the opposite grooved end faces 158 of the center plate 151 oppose the ungrooved end faces 156 of the corresponding spacer plates 152. With the various plates 150 in the order shown in FIG. 10 and oriented so that the holes 159 and 160 therein are in mutual and corresponding alinement, these plates may be brought together and assembled by inserting a dowel pin 166 in each of the alined holes 160. The assembly of plates may be clamped together by inserting a bolt 168 in the alined center holes 159, the head of such bolt being accommodated in the counterbored portion 161 of one of the end plates and the nut 169 on the threaded end of the bolt being accommodated in the counterbored portion 161 of the other end plate 150. The plates so assembled as illustrated in FIG. 11 are then heated to a temperature, for example, approximately 2050° F., sufficient to braze the various plates together.

Following brazing of the assembly which unites the various plates into a unitary structure, holes 170 are drilled therethrough at the places of intersection of the grooves therein and this structure is then adapted to be sub-divided into sections which serve as bushing blanks one of which is indicated at 171 in FIG. 12. A bushing blank 171 is adapted for subsequent external machining to convert its rectangular outline to one having a cylindrical configuration and of the appropriate diameter as illustrated at 172' in FIG. 13 and a section of which on a larger scale is illustrated in FIG. 14.

Reverting to FIG. 12, it will be seen that a bushing blank 171 is provided by cutting the brazed assembly along parallel and spaced planes 172 which extend intermediate and parallel to the superposed grooves 162 and 164, and by also cutting along planes 173 extending perpendicular to and intersecting with the first mentioned planes 172, the planes 173 extending intermediate and parallel to the superposed grooves 163 and 165.

Referring to FIG. 14, it will be seen that the cylindrical bushing blank 172' is composed of the two end parts 150', 150', the center part 151', and the two intermediate parts 152', 152', these parts being derived from the end plates 150, center plate 151 and intermediate or spacer plates 152, respectively. It will be seen that the grooves initially formed in these plates now form metering ports in the bushing blank 172'. Thus a pair of diametral ports 162' and a pair of diametral ports 163' are provided between the parts 150' and 152' at each end of the cylindrical bushing blank. Also, a pair of diametral ports 164' and another pair of diametral ports 165' are provided between the center part 151' and each of the intermediate parts 152' of the cylindrical bushing blank 172'. It will also be seen that the hole 170 in the cylindrical bushing blank 172' provides a longitudinal bore therefor.

The cylindrical bushing blank may be subsequently internally and externally machined into final form. Such a finished bushing is indicated at 173' in FIG. 15 and is shown as having two end parts 150'', 150'', a center part 151'' and two intermediate parts 152'', 152''. Its bore 170' has been honed to proper diameter. Its exterior has been reduced adjacent the various metering ports, as indicated at 174. The exterior has also been provided with annular grooves such as indicated at 175 adapted to receive sealing rings (not shown in FIG. 15). Radial holes 176 are provided in the intermediate parts 152''. The end parts 150'' are each also shown as provided with diametral holes 178.

Comparing the finished bushing shown in FIG. 15 with that shown in FIGS. 1 and 2, it will be seen that the center part 151'' of the bushing 173' is thicker or of greater axial length than the corresponding center part 104 of the bushing shown in FIGS. 1 and 2. This is merely because of the desired spacing governed by the axial length of the center lobe of the valve spool. The various plates 150 to 152 can therefore individually have the desired thickness which may differ from one plate to another, depending upon the design of the valve spool intended to be associated with the bushing, that is, the axial length of the various lobes of the valve spool and the axial spacing between the opposing and axially facing sides of the spool lobes.

While the holes 170 are preferably drilled in the assembly of plates after these plates have been brazed together, these holes can be provided at an earlier stage, such as by drilling the various plates individually or drilling the assembly of plates but prior to their being brazed together.

For control of low flows, one pair of slots may be omitted from the valve bushing. This is done by milling or otherwise machining only one series of parallel slots, instead of two series at right angles to each other.

For control of large flows, a full annular slot opening may be provided in the valve bushing. Such an annular slot opening is indicated at 180 in FIG. 16. This is achieved by drilling aligned holes 170a in each of the several plates, prior to brazing. Then each such hole 170a at the faces 154 and 158 shown in FIG. 10, or faces 112, 114, 115 and 113 shown in FIG. 2, are counterbored. The diameter of the counterbore 180 is slightly larger than that of the spool bore 170a, but sufficiently small to leave adequate brazing area between the opposing end faces of the component parts of the bushing.

From the foregoing it will be seen that the present invention in the two forms illustrated, fully accomplishes the stated objects. It is intended that the scope of this invention be defined solely by the appended claims.

What is claimed is:

1. In a method of making a bushing for a precision hydraulic servo mechanism and having a series of critically longitudinally spaced transverse passages therein and to receive a close-fitting and slidable valve spool having square-cornered radially flat-sided lobes adapted to open and close said passages, the combination of steps which comprises forming a plurality of bushing parts adapted for assembly in abutting end-to-end relation and including an intermediate part for each space between the opposing axially facing sides of each pair of adjacent lobes on said spool and of a length corresponding generally to the axial length of said space, working the opposing end faces of each pair of adjacent bushing parts to provide smooth flat surfaces and to provide each of said intermediate parts with a predetermined axial length, forming at least one parallel, flat-sided slot in the end face of each of the bushing parts intended for positioning at the opposite ends of each of said intermediate parts, and physically bonding said bushing parts arranged in proper order together by their opposing end faces to provide a unitary structure.

2. In a method of making a bushing for a precision hydraulic servo mechanism and having a series of critically longitudinally spaced transverse passages therein and to receive a close fitting and slidable valve spool having square-corner radially flat-sided lobes adapted to open and close said passages, the combination of steps which comprises forming a plurality of ferric metal bushing parts adapted for assembly in abutting end-to-end relation and including an intermediate part for each space between the opposing axially facing sides of each pair of adjacent lobes on said spool and of a length corresponding generally to the axial length of said space, grinding the opposing end faces of each pair of adjacent bushing parts to provide smooth flat surfaces and to provide each of said intermediate parts with a predetermined axial length, forming at least one parallel, flat-sided slot in the end face of each of the bushing parts intended for positioning at the opposite ends of each of said intermediate parts, providing a layer of copper on at least one of each pair of said opposing end faces, and heating said bushing parts assembled in proper order to a temperature sufficient to braze adjacent parts together to provide a unitary structure.

3. In a method of making a bushing for a precision hydraulic servo mechanism and having a series of critically longitudinally spaced transverse passages therein and to receive a close-fitting and slidable valve spool having square-cornered radially flat-sided lobes adapted to open and close said passages, the combination of steps which comprises forming a plurality of plates adapted to be stacked and including a spacer plate for each space between the opposing axially facing sides of each pair of adjacent lobes on said spool and of a thickness corresponding generally to the axial length of said space, working the opposing faces of each pair of adjacent plates to provide smooth flat parallel surfaces and to provide each of said spacer plates with a predetermined thickness, forming a series of parallel spaced flat-sided slots in the surface of those of said plates intended for positioning on opposite sides of each of said spacer plates and which surface opposes the corresponding spacer plate, physically bonding said plates arranged in proper order together by their opposing surfaces to provide a unitary structure, and cutting said structure along planes extending perpendicularly to said plates to provide a plurality of bushing blanks adapted severally for internal and external machining to provide a finished bushing.

4. In a method of making a bushing for a precision hydraulic servo mechanism and having a series of critically longitudinally spaced transverse passages therein and to receive a close-fitting and slidable valve spool having square-cornered radially flat-sided lobes adapted to open and close said passages, the combination of steps which comprises forming a plurality of plates adapted to be stacked and including a spacer plate for each space between the opposing axially facing sides of each pair of adjacent lobes on said spool and of a thickness corresponding generally to the axial length of said space, grinding the opposing faces of each pair of adjacent plates to provide smooth flat parallel surfaces and to provide each of said spacer plates with a predetermined thickness, forming a first series of parallel spaced flat-sided slots in the surface of those of said plates intended for positioning on opposite sides of each of said spacer plates and which surface opposes the corresponding spacer plate, forming a second series of parallel spaced flat-sided slots in each of the last-mentioned surfaces and which extend perpendicularly to said first series, applying a layer of copper on at least one of each pair of said opposing faces, assembling said plates in proper order, heating such plate assembly to a temperature sufficient to braze adjacent plates together to provide a unitary structure, and cutting said structure along planes severally intermediate said first and second series of slots to provide a plurality of bushing blanks adapted severally for internal and external machining to provide a finished bushing.

5. In a method of making a bushing for a precision hydraulic servo mechanism and having a series of critically longitudinally spaced transverse passages therein and to receive a close-fitting and slidable valve spool having square-cornered radially flat-sided lobes adapted to open and close said passages, the combination of steps which comprises forming a plurality of plates adapted to be stacked and including a spacer plate for each space between the opposing axially facing sides of each pair of adjacent lobes on said spool and of a thickness corresponding generally to the axial length of said space, grinding the opposing faces of each pair of adjacent plates to provide smooth flat parallel surfaces and to provide each of said spacer plates with a predetermined thickness, forming a first series of parallel spaced flat-sided slots in the surface of those of said plates intended for positioning on opposite sides of each of said spacer plates and which surface opposes the corresponding spacer plate, forming a second series of parallel spaced flat-sided slots in each of the last-mentioned surfaces and which extend perpendicularly to and intersect said first series, applying a layer of copper to a least one of each pair of said opposing faces, assembling said plates in proper order and oriented so that all of said first series of slots are in mutually superposed parallelism and all of said second series of slots are in mutually superposed parallelism, heating such plate assembly to a temperature sufficient to braze adjacent plates together to provide a unitary structure, drilling holes through said structure severally along axes extending through the centers of intersection of said slots, and cutting said structure along planes severally intermediate said first and second series of slots to provide a plurality of bushing blanks adapted severally for internal and external machining to provide a finished bushing.

6. In a method of making a bushing for a precision hydraulic servo valve mechanism and having a series of critically longitudinally spaced transverse passages therein and to receive a close-fitting and slidable valve spool having square-cornered radially flat-sided lobes adapted to open and close said passages, the combination of steps which comprises forming a plurality of bushing parts adapted for assembly in abutting end-to-end relation and including an intermediate part for each space between the opposing axially facing sides of each pair of adjacent lobes on said spool and of a length corresponding generally to the axial length of said space, working the opposing end faces of each pair of adjacent bushing parts to provide smooth flat surfaces and to provide each of said intermediate parts with a predetermined axial length, forming at least one parallel, flat-sided slot in the end face of each of the bushing parts intended for positioning at the opposite ends of each of said intermediate parts, forming an annular recess in each of those end faces provided with said slot and intersecting said slot, and physically bonding said bushing parts arranged in proper order together by their opposing end faces to provide a unitary structure.

7. In a method of making a bushing for a precision hydraulic servo mechanism and having a series of critically longitudinally spaced transverse passages therein and to receive a close-fitting and slidable valve spool having square-cornered radially flat-sided lobes adapted to open and close said passages, the combination of steps which comprises forming a plurality of plates adapted to be stacked and including a spacer plate for each space between the opposing axially facing sides of each pair of adjacent lobes on said spool and of a thickness corresponding generally to the axial length of said space, working the opposing faces of each pair of adjacent plates to provide smooth flat parallel surfaces and to provide each of said spacer plates with a predetermined thickness, forming a series of parallel spaced flat-sided slots in the surface of those of said plates intended for positioning on opposite sides of each of said spacer plates and which surface opposes the corresponding spacer plate, drilling holes through said plates, drilling a counterbore in each last-mentioned surface and concentric with the corresponding one of said holes, physically bonding said plates arranged in proper order together by their opposing surfaces to provide a unitary structure, and cutting said structure along planes extending intermediate said holes and perpendicularly to said plates to provide a plurality of bushing blanks adapted severally for internal and external machining to provide a finished bushing.

References Cited in the file of this patent
UNITED STATES PATENTS

| | | |
|---|---|---|
| 1,650,854 | Rouanet | Nov. 29, 1927 |
| 2,514,469 | Burkhardt | July 11, 1950 |
| 2,528,280 | Lyon | Oct. 31, 1950 |
| 2,630,135 | Johnson | Mar. 3, 1953 |
| 2,705,829 | Mock | Apr. 12, 1955 |